(12) United States Patent  
Krasnyanskiy

(10) Patent No.: US 8,718,030 B2
(45) Date of Patent: May 6, 2014

(54) METHODS AND APPARATUS FOR PERFORMING CHANNEL TREE OPERATIONS

(75) Inventor: Maksim Krasnyanskiy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 12/054,240

(22) Filed: Mar. 24, 2008

(65) Prior Publication Data

US 2008/0239992 A1 Oct. 2, 2008

Related U.S. Application Data

(60) Provisional application No. 60/908,181, filed on Mar. 26, 2007.

(51) Int. Cl.
*H04W 4/00* (2009.01)

(52) U.S. Cl.
USPC ............ 370/341; 370/336; 370/348; 370/347

(58) Field of Classification Search
USPC ......... 370/208, 278, 256, 329, 349, 408, 412; 711/147, 148, 153, 173, 5, 202, 209; 709/104, 106; 712/13, 14, 15
See application file for complete search history.

(56) References Cited

U.S. PATENT DOCUMENTS

| 5,490,274 | A | 2/1996 | Zbikowski et al. |
| 2003/0031152 | A1* | 2/2003 | Gohda et al. .................. 370/338 |
| 2003/0064752 | A1 | 4/2003 | Adachi et al. |
| 2004/0243563 | A1* | 12/2004 | Heiner et al. ...................... 707/3 |
| 2005/0015685 | A1* | 1/2005 | Yamamoto ....................... 714/54 |
| 2005/0136990 | A1 | 6/2005 | Hardacker et al. |
| 2006/0050627 | A1* | 3/2006 | Etemad et al. ................ 370/208 |
| 2006/0083183 | A1* | 4/2006 | Teague et al. ................. 370/278 |
| 2006/0156413 | A1* | 7/2006 | Oh et al. .......................... 726/26 |
| 2006/0233124 | A1 | 10/2006 | Palanki |
| 2007/0037600 | A1 | 2/2007 | Fukuda |

(Continued)

FOREIGN PATENT DOCUMENTS

| EP | 17131990 A1 | 10/2006 |
| JP | 2006024238 A | 1/2006 |

(Continued)

OTHER PUBLICATIONS

International Search Report and Written Opinion—PCT/US08/058090, International Search Authority—European Patent Office—Sep. 19, 2008.

(Continued)

*Primary Examiner* — Anez Ebrahim
(74) *Attorney, Agent, or Firm* — Peng Zhu

(57) ABSTRACT

Methods and apparatus for performing channel tree operations in a communication system are disclosed that order a channel tree to effect improved computation speed for channel tree operations for scheduling channel resources in the communication system. The disclosed methods include mapping each of one or more node identifiers of real nodes of a channel tree to corresponding virtual node identifiers based on a prescribed ordering scheme. After mapping, the methods include performing one or more operations on one or more of the real nodes of the channel tree using the virtual node identifiers. Corresponding apparatus configured to execute the disclosed methods are also disclosed.

58 Claims, 7 Drawing Sheets

(56) References Cited

U.S. PATENT DOCUMENTS

| | | | |
|---|---|---|---|
| 2007/0130465 A1 | 6/2007 | Zeng et al. | |
| 2007/0133695 A1* | 6/2007 | Kotzin | 375/260 |
| 2007/0203959 A1* | 8/2007 | Cho | 707/205 |
| 2008/0025256 A1* | 1/2008 | Ginzburg et al. | 370/329 |
| 2008/0298434 A1* | 12/2008 | Nyberg et al. | 375/134 |
| 2010/0029290 A1* | 2/2010 | Barbaresi et al. | 455/450 |

FOREIGN PATENT DOCUMENTS

| | | |
|---|---|---|
| KR | 20030043247 A | 6/2003 |
| RU | 2189072 | 9/2002 |
| TW | I268674 | 12/2006 |
| TW | I269546 B | 12/2006 |
| TW | I269549 | 12/2006 |
| WO | WO9728505 A1 | 8/1997 |
| WO | WO-2005077123 A2 | 8/2005 |
| WO | WO2006054506 A1 | 5/2006 |
| WO | WO2006102744 | 10/2006 |
| WO | WO2007024936 | 3/2007 |

OTHER PUBLICATIONS

Taiwan Search Report—TW097110871—TIPO—Dec. 13, 2011.

* cited by examiner

US 8,718,030 B2

METHODS AND APPARATUS FOR PERFORMING CHANNEL TREE OPERATIONS

CLAIM OF PRIORITY UNDER 35 U.S.C. §119

The present Application for Patent claims priority to Provisional Application No. 60/908,181 entitled "METHODS AND APPARATUS FOR PERFORMING CHANNEL TREE OPERATIONS" filed Mar. 26, 2007, and assigned to the assignee hereof and hereby expressly incorporated by reference herein.

BACKGROUND

1. Field

The present disclosure generally relates to methods and apparatus for performing channel tree operations in a communication system, and more particularly to ordering a channel tree to effect improved computation speed for channel tree operations for scheduling channel resources in the communication system.

2. Background

In communication systems, such as Orthogonal Frequency Division Multiplexed Access (OFDMA) systems, bandwidth of available resources may be represented as a hierarchical graph or "tree" of nodes (termed a "channel tree") representing system channels, which may be one or more frequencies, subcarriers, or tones. In future OFDMA systems, such as Ultra-Mobile Broadband (UMB), representation of available bandwidth as a channel tree utilizes certain well defined relationships between the nodes. As is known, a channel tree is used to assign frequencies to users in a communication network to ensure diversity among a plurality of receivers in the communication network. Various channel tree concepts are discussed in U.S. patent application Ser. No. 11/209,246 entitled "FREQUENCY HOPPING DESIGN FOR SINGLE CARRIER FDMA SYSTEMS" filed Aug. 22, 2005, and incorporated herein in its entirety.

Channel trees are typically used to signal Access Terminal (AT) assignments and overall bandwidth management by a scheduler unit. Because the scheduler is one of the more time sensitive pieces of an OFDMA system as an example, it may be appreciated that it is beneficial to have a fast and efficient performance of channel tree operations. Channel trees, however, conventionally are implemented using linked lists. In particular, this type of implementation involves a tree structure in which nodes are linked via pointers. The linked list structure, however, requires scanning of the structure for the majority of operations performed, thus limiting the speed and efficiency of the performance of channel tree operations.

SUMMARY

According to an aspect, a method for use in a communication system is disclosed. The method includes mapping at least one real node identifier of at least one of a plurality of real nodes of a channel tree to at least one corresponding virtual node identifier based on a prescribed ordering scheme. The method further includes performing at least one operation on at least one of the plurality of real nodes of the channel tree using the at least one virtual node identifier.

According to another aspect, the present application discloses an apparatus operable in a wireless communication system. The apparatus includes a processor configured to map at least one real node identifier of at least one of a plurality of real nodes of a channel tree to at least one corresponding virtual node identifier based on a prescribed ordering scheme. The apparatus also includes a memory coupled to the processor for storing the at least one virtual channel identifier.

According to still another aspect, an apparatus operable in wireless communication system is disclosed. The apparatus features means for mapping at least one real node identifier of at least one of a plurality of real nodes of a channel tree to at least one corresponding virtual node identifier based on a prescribed ordering scheme. The apparatus also features means for performing at least one operation on at least one of the plurality of real nodes of the channel tree using the at least one virtual node identifier.

In yet another aspect, a computer program product comprising computer-readable medium is disclosed. The computer-readable medium includes code for causing a computer to map each of at least one node identifier of real nodes of a channel tree to corresponding virtual node identifiers based on a prescribed ordering scheme. The computer readable-medium also includes code for causing a computer to perform at least one operation on at least one of the real nodes of the channel tree using the virtual node identifiers.

In still one other aspect, an apparatus for use in a communication system is disclosed. The apparatus features a scheduler configured to allocate channel resources in the communication system. Included in the scheduler is a first module configured to map at least one real node identifier of at least one of a plurality of real nodes of a channel tree to at least one corresponding virtual node identifier based on a prescribed ordering scheme. The scheduler also features a second module configured to perform at least one operation on at least one of the plurality of real nodes of the channel tree using the at least one virtual node identifier.

DETAILED DESCRIPTION

The present disclosure relates to methods and apparatus for ordering and performing channel tree operations in communication systems that afford improved computation speed for channel tree operations for scheduling channel resources in the communication system. In brief, the ordering of the channel tree includes mapping each of one or more node identifiers of real nodes of a channel tree to corresponding virtual node identifiers according to a prescribed ordering. More particularly, the prescribed ordering of the virtual node identifiers is based on the relationships between the nodes, such as parent/child relationships or how many subcarriers are represented by a particular node (i.e., how many "children" are engendered by the node). The virtual node identifiers may be arranged contiguously based on this ordering and represented by a bitmap. By utilizing a bitmap, certain channel tree operations can be performed with an improvement in the processing speed over performance of these same operations using the original channel tree of real node identifiers, such as by scanning of the channel tree structure.

Figure 1:
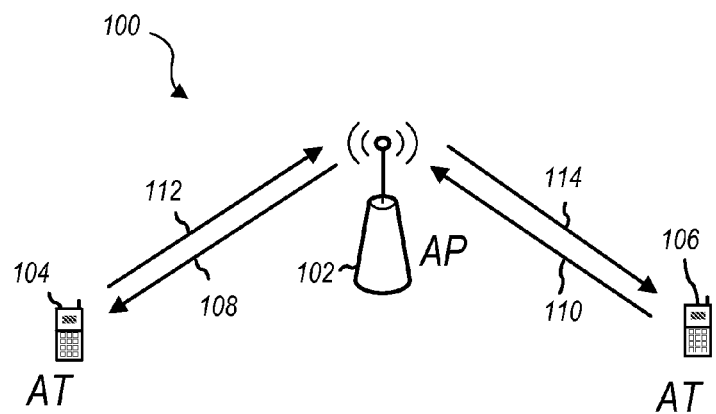
FIG. 1 illustrates a wireless communication system having an access point and access terminals according to an aspect of the present disclosure.

Referring to FIG. 1, an exemplary wireless communication system 100 in which the disclosed methods and apparatus may be implemented is illustrated. As shown, an access point 102 (AP) communicates with one or more access terminals (AT), such as terminals 104 and 106. The access point (AP) 102 transmits information to access terminals 104 and 106 over forward links 108 and 114, respectively. Additionally, the access point 102 may receive information from access terminals 104 and 106 over reverse links 112 and 110, respectively.

The access point 102 may include a scheduler (not shown in FIG. 1) that allocates channel resources used for communication with the access terminals AT (e.g., 104, 106). In determining resource allocation, the scheduler at AP 102 may utilize a channel tree to allocate subcarriers or tones. An exemplary channel tree that may be utilized is illustrated in FIG. 2.

Figure 2:
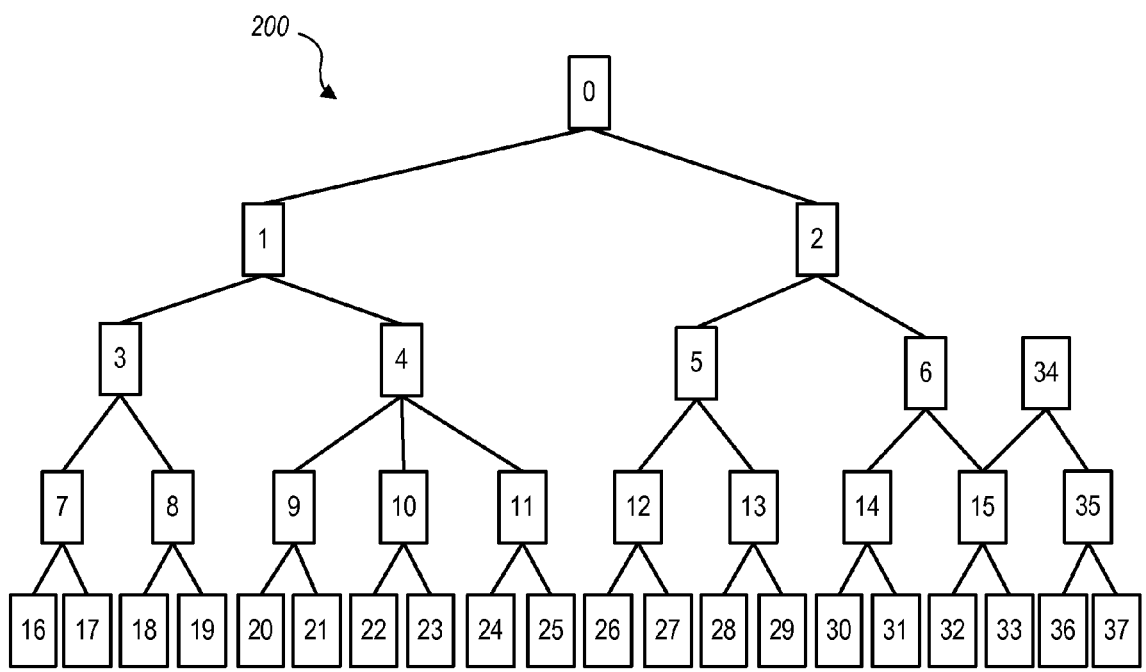
FIG. 2 is a channel tree diagram of real nodes in a communication system.

As shown in FIG. 2, the channel tree 200 includes a number of nodes, represented pictorially with numbered blocks. Each node represents a single channel in a communication system. The bottommost layer of channel tree 200, which is illustrated by blocks 16 through 33, 36 and 37 in this example are termed "base nodes" since these nodes do not have any "children" beneath them. In an exemplary system, the base nodes may be mapped to a set of a plurality of subcarriers or tones. In another exemplary system, the base nodes are mapped to a set of eight (8) tones or subcarriers. It is also noted here that the number of nodes illustrated in FIG. 2 is merely exemplary, and any of various numbers of nodes may be part of a channel tree.

Higher level nodes, such as node 7 for example, inherit all of the subcarriers of their descendants (i.e., nodes 16 and 17 in the example of node 7 in FIG. 2). Thus, node 7 would inherit nodes 16 and 17 and cover 16 subcarriers (assuming 8 subcarriers or tones per node). Additionally in some communication systems, it is specified that when a node is used or allocated, the descendants become restricted or unavailable for use, as well as the ancestors (i.e., the parent nodes). For example, if node 3 in FIG. 2 is allocated to an AT, this channel at allocation will be unavailable for use by other access terminals, as well as nodes 7, 8, 16-19 (i.e., the descendants), and nodes 0 and 1 (i.e., the parents).

As may also illustrated in FIG. 2, nodes graphed at the same "level", such as nodes 3 and 4, for example, do not necessarily have the same number of descendants, and thus allocable subcarriers. Additionally, those nodes of the same level are not necessarily numbered contiguously. Thus the structure of real nodes in FIG. 2 is not necessarily regular and is, in known applications, implemented using linked lists where the nodes of the channel tree are linked via pointer. Thus, allocation or scheduling operations using such linked lists require scanning or lookup tables executed by software.

Figure 3:
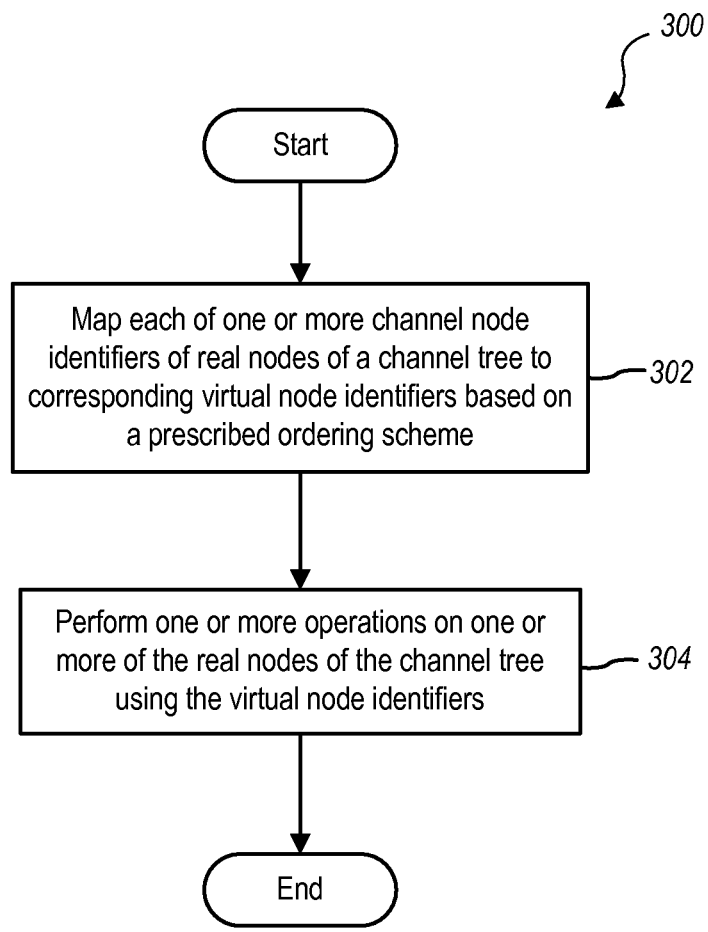
FIG. 3 is an exemplary flow diagram of a method for transforming a channel tree and performing operations in a communication system according to an aspect of the present disclosure.

Accordingly, in an aspect of the present disclosure, a channel tree in a communication system, such as channel tree 200 in FIG. 2, may be transformed by mapping real nodes to virtual nodes in order to allow more easily and efficiently implemented channel tree operations. An algorithm or methodology to effect such transformation is illustrated in the flow diagram of FIG. 3. As shown in FIG. 3, a method 300 includes a block 302 where each of one or more channel node identifiers of real nodes of a channel tree are mapped to corresponding virtual node identifiers based on a prescribed ordering scheme. As will be explained in more detail to follow, the prescribed ordering scheme effects a way to represent the relationships between real nodes of a channel tree (e.g., channel tree 200) using virtual nodes, which in turn is represented as bitmap.

After the mapping in block 302 is complete, flow proceeds to block 304 where one or more operations are performed on one or more of the real nodes of the channel tree using the virtual node identifiers. In an example where the mapping represents relationships between real nodes as a bitmap of virtual nodes, bitwise operations, such as "AND" and "OR" operations, may be utilized for the various scheduling operations (e.g., allocation and release of nodes) carried out during allocation of channel resources. It is noted that the processes in blocks 302 and 304 may be performed in the AP, such as by a scheduler in the AP, or alternatively could be performed by the ATs, which would communicate the virtual mapping information back to an AP.

As an illustration of how the methods and apparatus of the present disclosure transform or map the channel tree of real nodes to a channel tree of virtual nodes (e.g., the process of block 302 described above), FIG. 4 illustrates a flow diagram of a process for converting or transforming a channel tree of real nodes (e.g. FIG. 2) into a channel tree of virtual nodes (also referred to herein as the "prescribed ordering" of the channel tree). In order to represent relationships between the nodes in the transformed tree, the parent and child links are first determined or set up. This first determination is indicated by block 402 in the method 400 of FIG. 4. Based on this setup the number of tones or "hop-ports" for each node can be computed or determined as indicated by block 404 in FIG. 4. For example, in the channel tree of FIG. 2, a number of tones associated with the base nodes (e.g., 16-33, 36 37) is some predetermined number "n" of tones. For a parent node (i.e., a node having one or more children), such as node 3, the number of tones associated with the node would be the sum of the number of tones assigned to nodes 16-19, which are children or base nodes of node 3. In a system where each node represents a set of "n" tones, then the total number of tones represented by node 3 is n×4 nodes (nodes 16-19 as children of node 3). Thus, in an example where n=8, real node 3 would represent 32 tones.

After determination of the number of subcarriers for each of the nodes, the nodes are then sorted or ordered according to the number of subcarriers or "hop-ports." In particular, the nodes may be sorted or ordered according to the number of subcarriers, as well as by node identifier information. It is noted that the node identifier information may comprise simply the sequential numbering information. Thus, in the example of the channel tree of FIG. 2, the real node identifier values are simply the node numbers indicated within the boxes. According to an aspect, when ordering the nodes in the process of block 406, the nodes may be first sorted into sets according to the number of subcarriers, and then among the sets of nodes having the same number of subcarriers, the real node identifier may then be used to order or number the nodes within that set.

Using the example of FIG. 2, it can be seen that because node 4 in FIG. 2 has more children and, therefore, subcarriers, this node would be sorted or ordered to be numbered prior to node 3 in the virtual node mapping, even though the identifier of real node 4 is later occurring numerically than the real node identifier of node 3. This is because node 4 has a greater number of subcarriers and, thus will be ordered prior to node 3 in the virtual node mapping. Additionally, it is noted that the nodes 3 and 5, for example, have the same number of children (i.e., "sibling" nodes) and, thus, the same number of subcarriers or hop-nodes. Accordingly, when ordering these nodes, the nodes will be sorted with node 3 occurring sequentially in the sorted order before node 5 since the value of the real node identifier 5 is greater than the real node identifier value of node 3.

Figure 4:
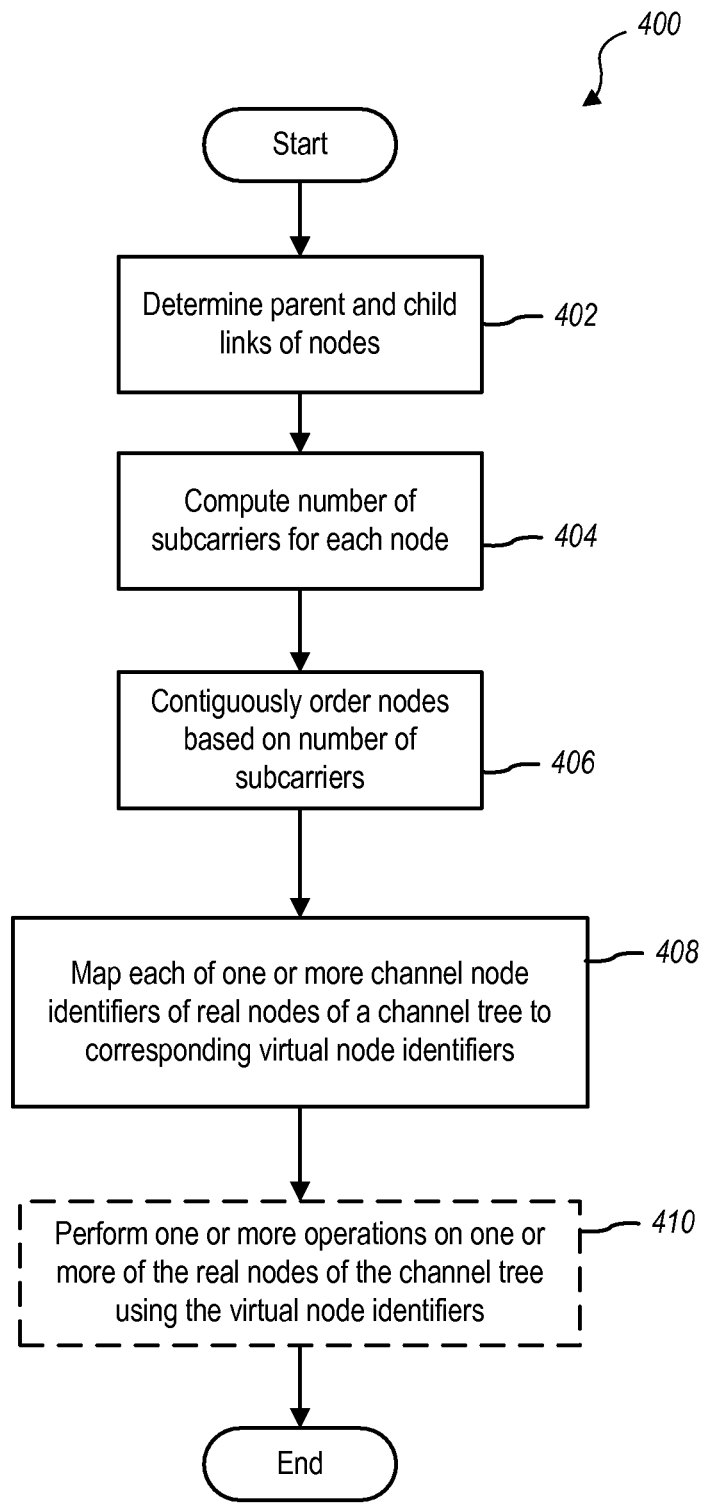
FIG. 4 is another example of a flow diagram of a method for transforming a channel tree and performing operations in a communication system according to an aspect of the present disclosure.

After determining the ordering of block 406 in FIG. 4, mapping each of one or more real node identifiers in a channel tree to corresponding virtual node identifiers is performed as illustrated in block 408. The mapping involves utilizing the sorted or ordered real nodes determined by the process of block 406 and then mapping this sequence of sorted real nodes to corresponding contiguously numbered virtual node identifiers. Since the virtual node identifiers are contiguous, the resultant transformed channel can be represented as a bitmap affording bitwise operations, which in turn engender improved computation speed for allocation, release, searching and state tracking operations, as examples. It will be appreciated that by transforming or mapping a channel tree of real nodes to contiguously numbered virtual node identifiers that have been sorted based on the number of subcarriers and channel node identifiers, the relationship between the nodes (i.e., parent, child, sibling) can then be effectively represented as a bitmap of the virtual node identifiers.

A mapping may be maintained and stored in a memory of a communication system, and that stored mapping may be used to translate between the environment in which operations are performed (the virtual identifiers) and the actual environment in which real channel identifiers are used and recognized by communication system entities. Thus, after bitwise operations are performed using the bitmap of virtual node identifiers, the results of the operations may then be translated back to the channel identifiers of the real nodes as indicated by alternate block 410, which corresponds to block 304 discussed previously with respect to FIG. 2.

Figure 5:
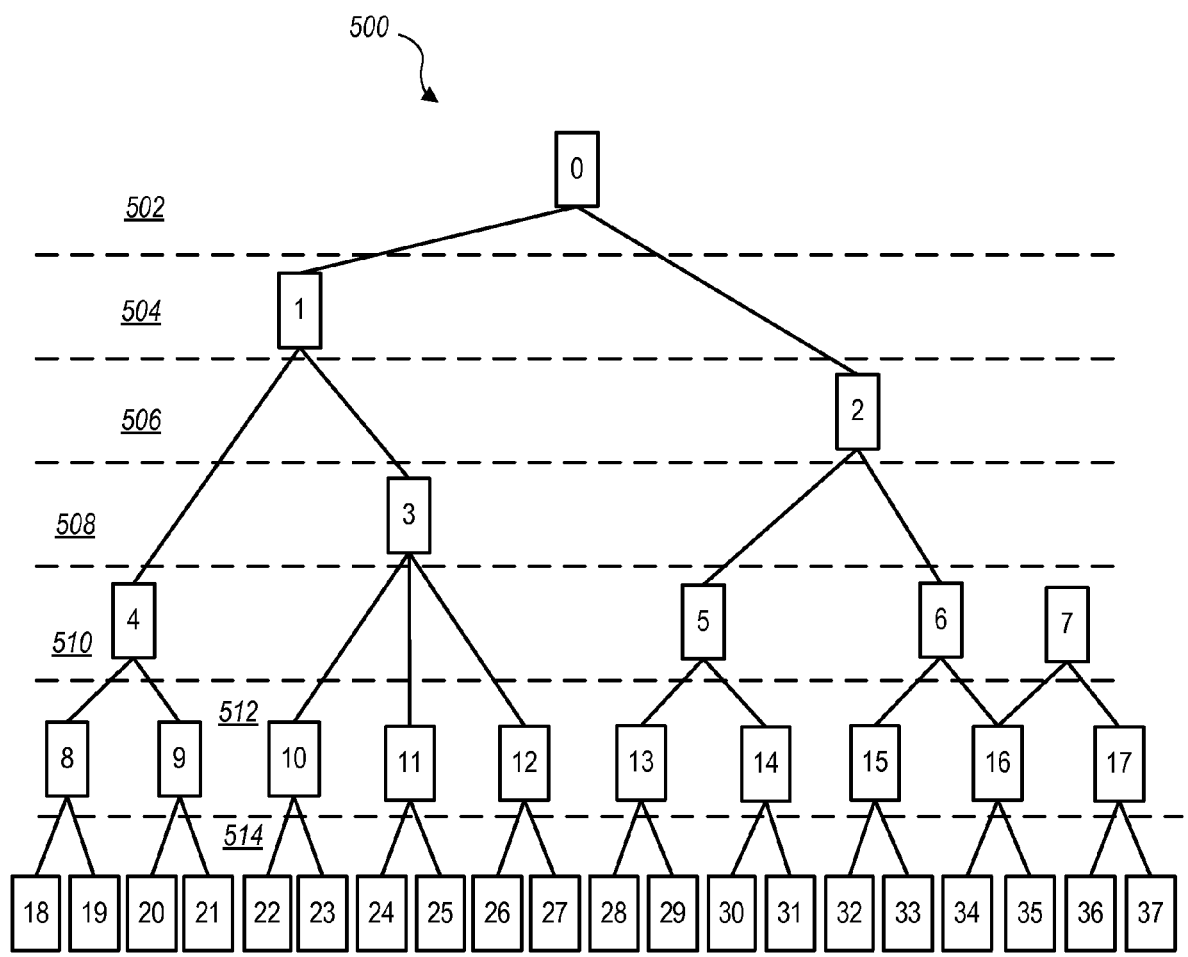
FIG. 5 is a transformation of the channel tree illustrated in FIG. 2 according to an aspect of the present disclosure.

FIG. 5 provides an exemplary illustration of the resultant transformed channel tree of virtual node identifiers 500 based on the example of FIG. 2. As may be seen in FIG. 5, the channel tree 500 may include the same number of nodes as the channel tree 200, but the node identifiers have been reordered. For example, node 3 of channel tree 200 is reordered and given virtual node identifier 4. Likewise, node 4 of channel tree 200 is node 3 in channel tree 500. This is due to the fact that node 4 of channel tree 200 has more subcarriers in children nodes (i.e., 9, 10, 11 and 20-25) than the children of node 3 (i.e., 7, 8, and 16-19). Thus, according to an aspect of the present methodology discussed above, node 4 is sorted ahead of node 3, and subsequently renumbered during mapping to virtual node identifiers.

Additionally, the transformed channel tree may be organized to place nodes within a hierarchy of hop-port or subcarrier levels. The example of FIG. 5 illustrates these levels by dashed line demarcations. The highest level 502 includes node 0, which is the node having no ancestors and represents the global number of subcarriers. A next level 504 includes node 1, which encompasses more subcarriers than node 2, for example. Similarly, the next level 506 includes node 2, level 508 includes remapped node 3, and so forth through illustrated levels 510 and 512 to the base node level 514.

FIG. 5 also illustrates the contiguous numbering of the virtual node identifiers within each of the multiple hop-port or subcarrier levels (502 through 514), and referred to hereinafter as "port levels." Thus, for example, node 34 (which is a sibling to node 6) in channel tree 200 is renumbered with virtual identifier number 7 since it is within port level 510 containing virtual nodes each having 4 base nodes (or 32 subcarriers in the case of 8 subcarriers/node in the illustrated example). Similarly, other nodes having the same number of children (and ultimately base nodes) are ordered contiguously in the same port level. Also, each port level can also be used to specify a range of contiguous virtual node identifier values all known to have the same number of hop-ports or subcarriers. By ordering the virtual nodes into port levels and contiguously numbering within each port level, this affords grouping of similarly situated nodes and the use of bitmaps for searching and state tracking. This, in turn, affords improved speed for the execution of such channel tree operations.

More particularly, the binary state of a respective bit for each node in the bitmap array may be used to indicate whether the node is allocated or de-allocated within the bitmap of virtual node identifiers. When a node is allocated, a bit value for that node indicates whether the node is allocated or "restricted." For example, if the bit is set to zero this state could be designated to indicate that the node is allocated or "restricted" (or alternatively a state of one could indicate the node is restricted). Accordingly, for bitwise operations, logical operations such as "AND" and "OR" may be carried out using these bit values in the array of the bitmap in execution of the operations.

Each of the virtual nodes in the channel tree of FIG. 5, which represent a channel, may have information associated with each node in a database. The information may include the virtual node identifier, as well as information such as the number of parent nodes, children nodes, and related nodes associated with that node. Other information associated with a node may include node properties such as "reserved" status, which reserves the node to prevent allocation of that particular node as one example.

According to an aspect of the presently disclosed methods and apparatus, algorithms may be implemented to permit at least a portion of the channel tree operations to be performed more efficiently. In an exemplary implementation, the disclosed remapping of the channel tree may be utilized for searching for available nodes, such as in the form of simple first-fit type algorithm. For example, when a scheduler is looking for a particular number of subcarriers or tones to allocate, allocation is simply a matter of searching a port level having the requisite number of tones for the first node available because the remapped channel tree (e.g., FIG. 5) is ordered to include port levels where each node has the same number of subcarriers or tones,. In a particular example, by representing node relationships with a bitmap, various embodiments may use what is termed a "find_first_bit" instruction to perform fast searches. In this case, when a certain number of subcarriers or tones are required, a search of a port level having the requisite number of subcarriers looks at the allocation bits of the nodes to find the first non-asserted bit (i.e., either a zero or one value dependent upon which value is preselected to indicate allocation of a node). According to a further aspect, the search function may be generic in nature and may be capable of handling non-binary trees and other searches as well.

Figure 6:
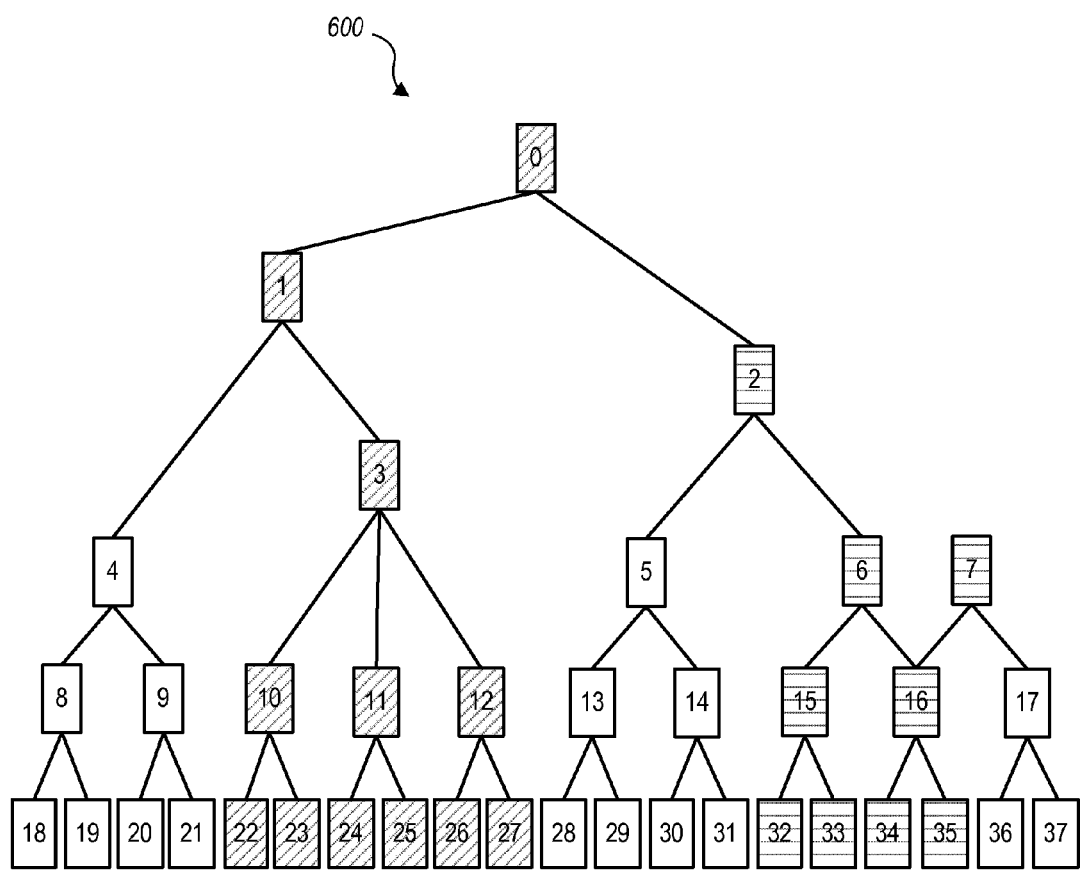
FIG. 6 is an illustration of channel tree operations for allocating nodes of the channel tree of FIG. 5.

According to another aspect, allocation (e.g., allocation of nodes to a terminal AT) or "restriction mask" operations may be efficiently executed given the above-described remapping of the channel tree. As an example, FIG. 6 illustrates a restriction masking of nodes in the exemplary channel tree of FIG. 5. In the illustrated example, if node 3 is to be restriction masked or allocated to a certain AT, it follows from conventional channel tree constraints that the children of this node are also restricted or allocable to the AT. By performing an AND operation with the allocation bit of node 3 and the allocation bits of the children (i.e., virtual nodes 10-12 and 22-27), these nodes can also be allocated via simple bitwise operations. As illustrated in FIG. 6, these allocated nodes are shown with slanted hatched lines to indicate allocation.

Additionally, when a node, which is a child of some other node, is allocated, the parent or parents are also allocated in the sense that not all children of those nodes are available for allocation. Accordingly in the example of FIG. 6, nodes 0 and 1 are allocated by performing an AND operation with the allocation bit of node 3 and the allocation bits of nodes 0 and 1, respectively. Allocation of nodes 0 and 1 do not preclude subsequent allocation of other nodes in the channel tree, except if all the channels of that node in the tree are desired. For example, node 4, which is a child of node 1, is allocable in this example for up to the number of subcarriers or tones available under that node.

In another example illustrated in FIG. 6, if node 6 is to be allocated to a user terminal (AT), an AND operation would be performed with the allocation bit of node 6 and the allocation bits of the descendant nodes 15, 16, and 32-35. The allocation of these nodes is indicated by shading with horizontal lines. Additionally, AND operations would be performed with the allocation bits of the parent nodes 2 and 0 and the allocation bit of node 6 to, thus, allocate these nodes as well (It is noted that the shading of node 0 in this example is not shown with horizontal line shading due to the previously described example). Of further note, since node 7, having no parent node, nonetheless shares children nodes with node 6, an AND operation would also be performed with the allocation bit of node 7 and the allocation bit of node 6 to show allocation since nodes 16 and 34-35 are now allocated and all children nodes of node 7 are not unallocated.

It is noted that FIG. 6 merely illustrates two examples of restriction masking or allocation, and that various other allocations could be effected in the channel tree shown. It is also noted that although AND operations have been described, one skilled in the art will appreciate that other logical operations (OR, NAND, NOR, XOR, etc.) may be utilized for effecting various operations in the channel tree.

According to another aspect, the un-restriction masking, or de-allocation operations may also be performed using the bitmap of virtual node identifiers. For example, in the case where an allocated node is no longer needed and can be de-allocated, the state of the allocation bit of that node is changed. Additionally, the descendant nodes of the de-allocated node, may then also be de-allocated, such as through an OR operation of the allocation bit of the parent node with the allocation bits of the children nodes to change their states as well. Furthermore, if there are related nodes (i.e., parent or sibling nodes), these nodes can be de-allocated if other children of these nodes are not currently allocated.

Figure 7:
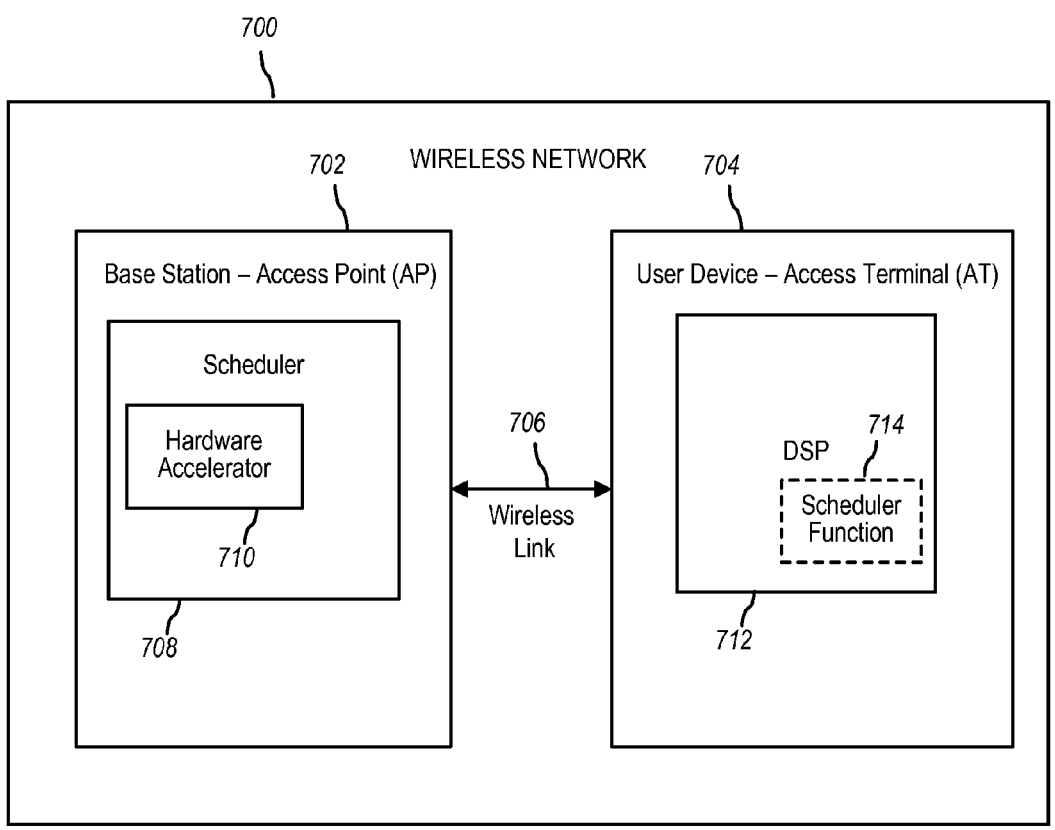
FIG. 7 is a block diagram of wireless network apparatus for use in the wireless communication system of FIG. 1 utilizing the presently disclosed methods.

FIG. 7 illustrates a block diagram of a wireless network 700 in which the presently methods may be utilized. Network 700 includes a base station or access point (AP) 702 that communicates with at least one user terminal or access terminal (AT) 704 via a wireless link 706. AP 702 may include a scheduler 708 or other similar functional unit used to allocate channels (i.e., a set of subcarriers or tones) used by the AP 702 in communication over the wireless link 706. It is noted that scheduler 708 functions to allocate the channels in a channel tree using the various methodologies described previously. Scheduler 708 may be implemented using a processor and associated memory (not shown). Additionally in an example, because the present methodology affords representing the node relationships with a bitmap, scheduler 708 may include logic hardware (labeled as hardware accelerator 710) that may be utilized for faster searching of available nodes. As an example, the accelerator 710 may be used to accelerate the find_first_bit instruction, discussed above, such that when the instruction is called by the scheduler, the instruction is executed in hardware. According to a further aspect, the search function may be generic in nature and may be capable of handling non-binary trees and other searches as well. The accelerator 710 may be implemented using any suitable hardware devices, such as general purpose processors (GPPs), digital signal processors (DSPs), or any other suitable processor or logic hardware.

Additionally, the AT 704 may also include functional apparatus for executing scheduling operations, such as allocation and de-allocation operations. This functional apparatus may consist of a digital signal processor (DSP) 712 or any other suitable processor. Additionally, in some communication systems, the AT 704 may receive assignment messages from the AP 702, which include information about the channel tree, and execute software running on either the DSP 712 or other suitable processor to perform allocation or restriction masking, as well as de-allocation or un-restriction masking operations as also indicated with the alternate functional block labeled "scheduler functions" 714. The resultant allocations from such operations can also be communicated back to the AP 702 over the wireless link so that other AT's in the communication system (not shown) receive information concerning channel tree allocation computed in AP 702.

In an aspect, an AT, such as AT 704, may utilize a restriction masking or allocation described previously. As an example, computations at an AT may include first receiving channel tree information from an AP, both real node identifiers as well as virtual node identifiers. After receiving the channel tree information, the allocation bits for all nodes in the tree may be restricted. The AT may then un-restrict or de-allocate one or more nodes for those channels assigned to the particular AT using an OR operation, as an example. In this way, those nodes resulting in de-allocation status, are known to be allocated to the AT.

Figure 8:
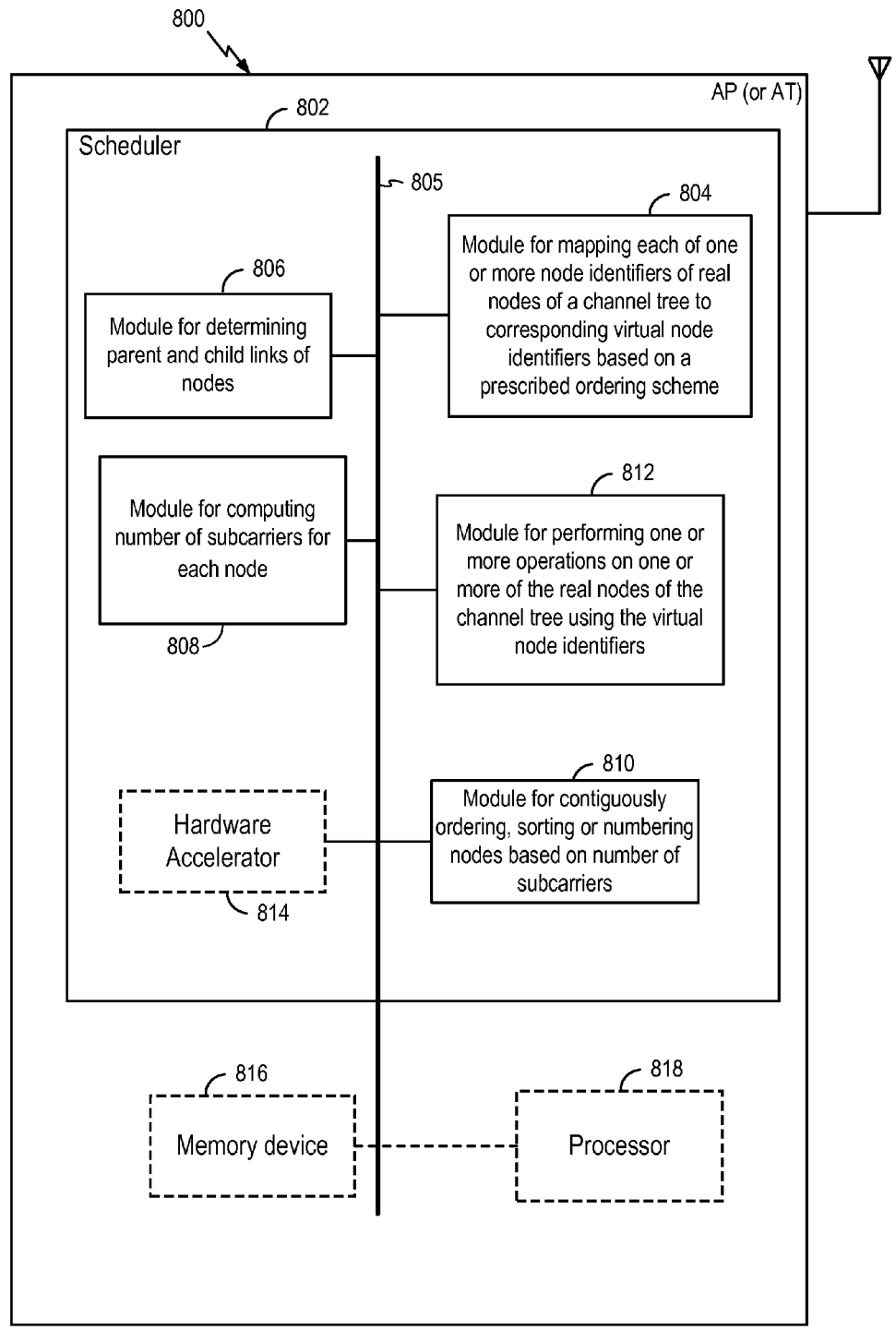
FIG. 8 is a block diagram of another example of an apparatus for use in a wireless communication system utilizing the disclosed methods.

In another aspect, restriction masking and un-restriction masking may be employed within the AT to indicate de-allocation in an implicit manner. In particular, the AT may restrict or set the allocation bits of all nodes in the channel tree. Next, an un-restriction masking or de-allocation is performed for those nodes or channels assigned to the particular AT. If information becomes known concerning the assignment to another AT of channels including children nodes of an allocated node in the AT, a restriction masking operation (e.g., ANDing operation) may performed on those nodes FIG. 8 illustrates a block diagram of yet another example of an apparatus 800 for use in a communication system that implements the presently disclosed methods. The apparatus 800 may be an access point (AP) or an access terminal (AT) in a wireless communication system, as examples. The apparatus 800 includes a scheduler 802 used for allocating and scheduling channel resources in at least a portion of communications system. The scheduler 802 may be implemented by one or more processors, hardware, firmware, or any combination thereof.

Scheduler 802 includes a module 804 for mapping each of one or more channel node identifiers of real nodes of a predetermined channel tree to corresponding virtual node identifiers based on a prescribed ordering scheme. Module 804 may then communicate the resultant mapping via a communication bus 805 as shown, or any other suitable communication coupling, to the various other modules, processors, and memory devices.

Scheduler 802 also includes a module 806 for determining parent and child links of nodes of the real nodes of a channel tree. It is noted that the function of module 806 may be part of the "prescribed ordering scheme," and thus module 806 could be subsumed by module 804. Scheduler 802 also includes a module 808 for computing number of subcarriers or tones for each node. This computation may then used by a module 810 for contiguously ordering or sorting nodes based on number of subcarriers as was described previously. For example, nodes having the same number of subcarriers, hop-ports or tones are sorted into port levels and also numbered contiguously therein. It is also noted that modules 808 and 810 can be characterized as effecting the prescribed ordering scheme accomplished by module 804, and thus could be subsumed by this module as an alternative.

Scheduler 802 also includes a module 812 for performing one or more operations on one or more of the real nodes of the channel tree using the virtual node identifiers determined by modules 804 (as well as modules 806, 808, 810). As described previously, the virtual node identifiers can be arranged as a bitmap and bitwise operations carried out using the bitmap. Thus, module 812 may be implemented to effect the bitwise operations, discussed in more detail previously. In order to increase the computations of not only bitwise operations, but also node searching (e.g., find_first_bit), scheduler 802 may include hardware for performing computations or searching available nodes, such as hardware accelerator 814 illustrated in FIG. 8. The hardware accelerator 814 may be part of the scheduler 802 as shown, or separate from the scheduler 802. It is noted that the scheduler 802 and the accelerator 814 may be implemented using any suitable devices, such as general purpose processors (GPPs), digital signal processors (DSPs), or any other suitable processor or logic hardware and combinations thereof.

The mapping or reordering of the channel tree effected by the various modules in apparatus 800 may be maintained and stored in a memory, such as memory device 816 of a communication system. Additionally, the mapping may be used to translate between the environment in which operations are performed (the virtual representation) and the actual environment in which real channel identifiers are used and recognized by communication system entities. The apparatus 800 may also include one or more processors, such as processor 818 configured to execute one or more of the functions of scheduler 802. It is also noted that apparatus 800 may be configured as either an access point (AP), such as AP 102 in FIG. 1, and access terminal (AT) such as AT 104 or 106.

It is noted that the disclosed methods and apparatus, by reordering a communication system channel tree to afford representing node relationships as a bitmap, allow for at least a portion of the channel tree operations to be performed more efficiently, such as through hardware. This, in turn, greatly speeds up operations involving the channel tree as much as orders of magnitude.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The examples disclosed herein are provided to enable any person skilled in the art to make or use the presently disclosed subject matter. Various modifications to these disclosed examples will be readily apparent to those skilled in the art, and the generic principles defined herein may be applied to other embodiments without departing from the teachings of the present disclosure. It is also noted that the word "exemplary" is used exclusively herein to mean "serving as an example, instance, or illustration." Any example described herein as "exemplary" is not necessarily to be construed as preferred or advantageous over other examples. Thus, the present disclosure is not intended to be limited to the examples shown herein, but is to be accorded the widest scope consistent with the principles and novel features disclosed herein.

What is claimed is:

1. A method implemented in an apparatus for use in a wireless communication system, the method comprising:
    mapping, via the apparatus, a plurality of real resource identifiers of a plurality of channel resources of a channel tree to a plurality of corresponding virtual resource identifiers based on a prescribed scheme, wherein each of the plurality of channel resources is associated with a real resource identifier and a corresponding virtual resource identifier, and wherein the plurality of channel resources are mapped to a plurality of subcarriers in the wireless communication system, wherein the wireless communication system is based on OFDMA; and
    performing, via the apparatus, at least one operation related to resource allocation for at least one channel resource among the plurality of channel resources using at least one virtual resource identifier of the at least one channel resource.

2. The method according to claim 1, wherein the prescribed scheme includes contiguous numbering of the plurality of virtual resource identifiers among channel resources sorted based on a number of subcarriers associated with each channel resource.

3. The method according to claim 1, wherein the prescribed scheme includes representing relationships between the plurality of channel resources as a bitmap of virtual resource identifiers.

4. The method according to claim 3, wherein the relationships include at least one of parent, child, and sibling relationships between channel resources.

5. The method according to claim 3, wherein the performing at least one operation includes performing at least one bitwise operation using bitmap values of the bitmap of virtual resource identifiers.

6. The method according to claim 5, wherein the at least one bitwise operation is performed in software, or firmware, or hardware, or a combination thereof.

7. The method according to claim 5, wherein the performing at least one bitwise operation comprises performing a masking operation on a set of bits in the bitmap.

8. The method according to claim 3, wherein the bitmap comprises a bit value for each of the plurality of virtual resource identifiers, the bit value for each virtual resource identifier indicating whether a corresponding channel resource is allocated or de-allocated.

9. The method according to claim 1, wherein the at least one operation is for allocating the at least one channel resource to at least one user terminal in the wireless communication system.

10. The method according to claim 1, wherein the at least one operation is for de-allocating the at least one channel resource from at least one user terminal in the wireless communication system.

11. The method according to claim 1, further comprising:
    sorting the plurality of real resource identifiers of the plurality of channel resources into a plurality of resource levels based on a number of subcarriers associated with each channel resource; and
    assigning contiguously numbered virtual resource identifiers to one or more real resource identifiers within each of the plurality of resource levels.

12. The method according to claim 1, wherein each channel resource is associated with a set of one or more subcarriers in an Orthogonal Frequency Division Multiplexed Access (OFDMA) communication system.

13. The method according to claim 1, wherein the method is executed by an access point or an access terminal.

14. The method according to claim 1, wherein the at least one operation is for searching for an available channel resource to allocate to a user terminal.

15. An apparatus operable in a wireless communication system, the apparatus comprising:
    a processor configured to map a plurality of real resource identifiers of a plurality of channel resources of a channel tree to a plurality of corresponding virtual resource identifiers based on a prescribed scheme, and to perform at least one operation related to resource allocation for at least one channel resource among the plurality of channel resources using at least one virtual resource identifier of the at least one channel resource, wherein each of the plurality of channel resources is associated with a real resource identifier and a corresponding virtual resource identifier, and wherein the plurality of channel resources are mapped to a plurality of subcarriers in the wireless communication system, wherein the wireless communication system is based on OFDMA; and
    a memory coupled to the processor for storing the plurality of virtual resource identifiers.

16. The apparatus according to claim 15, wherein the processor is further configured to execute the prescribed scheme through contiguous numbering of the plurality of virtual resource identifiers among channel resources sorted based on a number of subcarriers associated with each channel resource.

17. The apparatus according to claim 15, wherein the processor is further configured to execute the prescribed scheme through representing relationships between the plurality of channel resources as a bitmap of virtual resource identifiers.

18. The apparatus according to claim 17, wherein the relationships include at least one of parent, child, and sibling relationships between channel resources.

19. The apparatus according to claim 17, wherein the processor is further configured to perform at least one bitwise operation using bitmap values of the bitmap of virtual resource identifiers.

20. The apparatus according to claim 19, wherein the at least one bitwise operation is performed in software run by the processor, or hardware receiving instructions from the processor, or both.

21. The apparatus according to claim 19, wherein the at least one bitwise operation comprises a masking operation on a set of bits in the bitmap.

22. The apparatus according to claim 17, wherein the bitmap comprises a bit value for each of the plurality of virtual resource identifiers, the bit value for each virtual resource identifier indicating whether a corresponding channel resource is allocated or de-allocated.

23. The apparatus according to claim 15, wherein the at least one operation is for allocating the at least one channel resource to at least one user terminal in the wireless communication system.

24. The apparatus according to claim 15, wherein the at least one operation is for de-allocating the at least one channel resource from at least one user terminal in the wireless communication system.

25. The apparatus according to claim 15, wherein the processor is configured to
sort the plurality of real resource identifiers of the plurality of channel resources into a plurality of resource levels based on a number of subcarriers associated with each channel resource; and
assign contiguously numbered virtual resource identifiers to one or more real resource identifiers within each of the plurality of resource levels.

26. The apparatus according to claim 15, wherein each channel resource is associated with a set of one or more subcarriers in an Orthogonal Frequency Division Multiplexed Access (OFDMA) communication system.

27. The apparatus according to claim 15, wherein the apparatus is employed in an access point or an access terminal.

28. The apparatus according to claim 15, wherein the at least one operation is for searching for an available channel resource to allocate to a user terminal.

29. An apparatus operable in a wireless communication system, the apparatus comprising:
means for mapping a plurality of real resource identifiers of a plurality of channel resources in of a channel tree to a plurality of corresponding virtual resource identifiers based on a prescribed scheme, wherein each of the plurality of channel resources is associated with a real resource identifier and a corresponding virtual resource identifier, and wherein the plurality of channel resources are mapped to a plurality of subcarriers in the wireless communication system, wherein the wireless communication system is based on OFDMA; and
means for performing at least one operation related to resource allocation for at least one channel resource among the plurality of channel resources using at least one virtual resource identifier of the at least one channel resource.

30. The apparatus according to claim 29, further comprising means for contiguously numbering the plurality of virtual resource identifiers among channel resources sorted based on a number of subcarriers associated with each channel resource.

31. The apparatus according to claim 29, further comprising means for representing relationships between the plurality of channel resources as a bitmap of virtual resource identifiers.

32. The apparatus according to claim 31, wherein the relationships include at least one of parent, child, and sibling relationships between channel resources.

33. The apparatus according to claim 31, wherein the means for performing at least one operation includes means for performing at least one bitwise operation using bitmap values of the bitmap of virtual resource identifiers.

34. The apparatus according to claim 33, wherein the at least one bitwise operation is performed in software, or firmware, or hardware, or a combination thereof.

35. The apparatus according to claim 33, wherein the means for performing at least one bitwise operation comprises means for performing a masking operation on a set of bits in the bitmap.

36. The apparatus according to claim 31, wherein the bitmap comprises a bit value for each of the plurality of virtual resource identifiers, the bit value for each virtual resource identifier indicating whether a corresponding channel resource is allocated or de-allocated.

37. The apparatus according to claim 29, wherein the at least one operation is for allocating the at least one channel resource to at least one user terminal in the wireless communication system.

38. The apparatus according to claim 29, wherein the at least one operation is for de-allocating the at least one channel resource from at least one user terminal in the wireless communication system.

39. The apparatus according to claim 29, further comprising:
means for sorting the plurality of real resource identifiers of the plurality of channel resources into a plurality of resource levels based on a number of subcarriers associated with each channel resource; and
means for assigning contiguously numbered virtual resource identifiers to one or more real resource identifiers within each of the plurality of resource levels.

40. The apparatus according to claim 29, wherein each channel resource is associated with a set of one or more subcarriers in an Orthogonal Frequency Division Multiplexed Access (OFDMA) communication system.

41. The apparatus according to claim 29, wherein the apparatus is employed in an access point or an access terminal.

42. The apparatus according to claim 29, wherein the at least one operation is for searching for an available channel resource to allocate to a user terminal.

43. An apparatus for use in a wireless communication system, the apparatus comprising:
a scheduler configured to allocate channel resources in the wireless communication system, the scheduler including:
a first non-transitory module configured to map a plurality of real resource identifiers of a plurality of channel resources of a channel tree to a plurality of corresponding virtual resource identifiers based on a prescribed scheme, wherein each of the plurality of channel resources is associated with a real resource identifier and a corresponding virtual resource identifier, and wherein the plurality of channel resources are mapped to a plurality of subcarriers in the wireless communication system, wherein the wireless communication system is based on OFDMA; and a second non-transitory module configured to perform at least one operation related to resource allocation for at least one channel resource among the plurality of channel resources using at least one virtual resource identifier of the at least one channel resource.

44. The apparatus according to claim 43, further comprising:
a third non-transitory module configured to contiguously number the plurality of virtual resource identifiers among channel resources sorted based on a number of subcarriers associated with each channel resource.

45. The apparatus according to claim 43, wherein the prescribed scheme includes representing relationships between the plurality of channel resources as a bitmap of virtual resource identifiers.

46. The apparatus according to claim 45, wherein the relationships include at least one of parent, child, and sibling relationships between channel resources.

47. The apparatus according to claim 45, wherein the at least one operation includes at least one bitwise operation using bitmap values of the bitmap of virtual resource identifiers.

48. The apparatus according to claim 47, wherein the at least one bitwise operation is performed in software, or firmware, or hardware, or a combination thereof.

49. The apparatus according to claim 43, wherein the at least one operation is for allocating the at least one channel resource to at least one user terminal in the wireless communication system.

50. The apparatus according to claim 43, wherein the at least one operation is for de-allocating the at least one channel resource from at least one user terminal in the wireless communication system.

51. The apparatus according to claim 43, further comprising:
a third non-transitory module configured to order the plurality of real resource identifiers of the plurality of channel resources into a plurality of resource levels based on a number of subcarriers associated with each channel resource; and a fourth non-transitory module configured to assign contiguously numbered virtual resource identifiers to one or more real resource identifiers within each of the plurality of resource levels.

52. The apparatus according to claim 43, wherein each channel resource is associated with a set of one or more subcarriers in an Orthogonal Frequency Division Multiplexed Access (OFDMA) communication system.

53. The apparatus according to claim 43, wherein the apparatus is included in an access point or an access terminal.

54. A non-transitory computer-readable medium comprising:
code for causing a computer to map a plurality of real resource identifiers of a plurality of channel resources of a channel tree to a plurality of corresponding virtual resource identifiers based on a prescribed scheme, wherein each of the plurality of channel resources is associated with a real resource identifier and a corresponding virtual resource identifier, and wherein the plurality of channel resources are mapped to a plurality of subcarriers in a wireless communication system, wherein the wireless communication system is based on OFDMA; and
code for causing the computer to perform at least one operation related to resource allocation for at least one channel resource among the plurality of channel resources using at least one virtual resource identifier of the at least one channel resource.

55. The non-transitory computer-readable medium according to claim 54, wherein the prescribed scheme includes contiguous numbering of the plurality of virtual resource identifiers among channel resources sorted based on a number of subcarriers associated with each channel resource.

56. The non-transitory computer-readable medium according to claim 54, wherein the prescribed scheme includes representing relationships between the plurality of channel resources as a bitmap of virtual resource identifiers.

57. The non-transitory computer-readable medium according to claim 56, wherein the relationships include at least one of parent, child, and sibling relationships between channel resources.

58. The non-transitory computer-readable medium according to claim 56, wherein the at least one operation includes at least one bitwise operation using bitmap values of the bitmap of virtual resource identifiers.

* * * * *